United States Patent
Torikai

(10) Patent No.: US 9,801,007 B2
(45) Date of Patent: Oct. 24, 2017

(54) COMMUNICATION APPARATUS, METHOD FOR CONTROLLING COMMUNICATION APPARATUS, AND STORAGE MEDIUM

(71) Applicant: CANON KABUSHIKI KAISHA, Tokyo (JP)

(72) Inventor: Hiroyuki Torikai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 36 days.

(21) Appl. No.: 14/825,397

(22) Filed: Aug. 13, 2015

(65) Prior Publication Data

US 2016/0050517 A1 Feb. 18, 2016

(30) Foreign Application Priority Data

Aug. 18, 2014 (JP) ................................ 2014-165970

(51) Int. Cl.
*H04W 4/00* (2009.01)
*H04W 76/02* (2009.01)
*H04W 68/00* (2009.01)

(52) U.S. Cl.
CPC ......... *H04W 4/008* (2013.01); *H04W 68/005* (2013.01); *H04W 76/023* (2013.01)

(58) Field of Classification Search
CPC combination set(s) only.
See application file for complete search history.

(56) References Cited

U.S. PATENT DOCUMENTS

| | | | | |
|---|---|---|---|---|
| 2013/0215467 A1* | 8/2013 | Fein | ..................... | G06F 3/1204 358/1.15 |
| 2014/0253965 A1* | 9/2014 | Asai | ..................... | G06F 3/1205 358/1.15 |
| 2014/0354837 A1* | 12/2014 | Okazaki | ................. | G06F 13/00 348/211.2 |
| 2015/0009016 A1* | 1/2015 | Dai | ..................... | H04W 48/16 340/10.1 |
| 2015/0278564 A1* | 10/2015 | Naruse | ................. | G06F 3/1292 340/10.51 |

FOREIGN PATENT DOCUMENTS

JP 2013-157736 A 5/2003

* cited by examiner

*Primary Examiner* — Junpeng Chen
(74) *Attorney, Agent, or Firm* — Canon U.S.A., Inc. IP Division

(57) ABSTRACT

A communication apparatus includes a first communication unit that receives data via a first communication from a recording area of an external apparatus configured to record data in the recording area readable by another device via the first communication, a second communication unit that connects with the external apparatus via a second communication different from the first communication, a determination unit that determines whether to rewrite data recorded in the recording area of the external apparatus based on information, acquired from the external apparatus via the second communication unit, about the data recorded in the recording area, and a notification unit that provides notification that the data recorded in the recording area is to be rewritten based on a result of the determination by the determination unit.

15 Claims, 9 Drawing Sheets

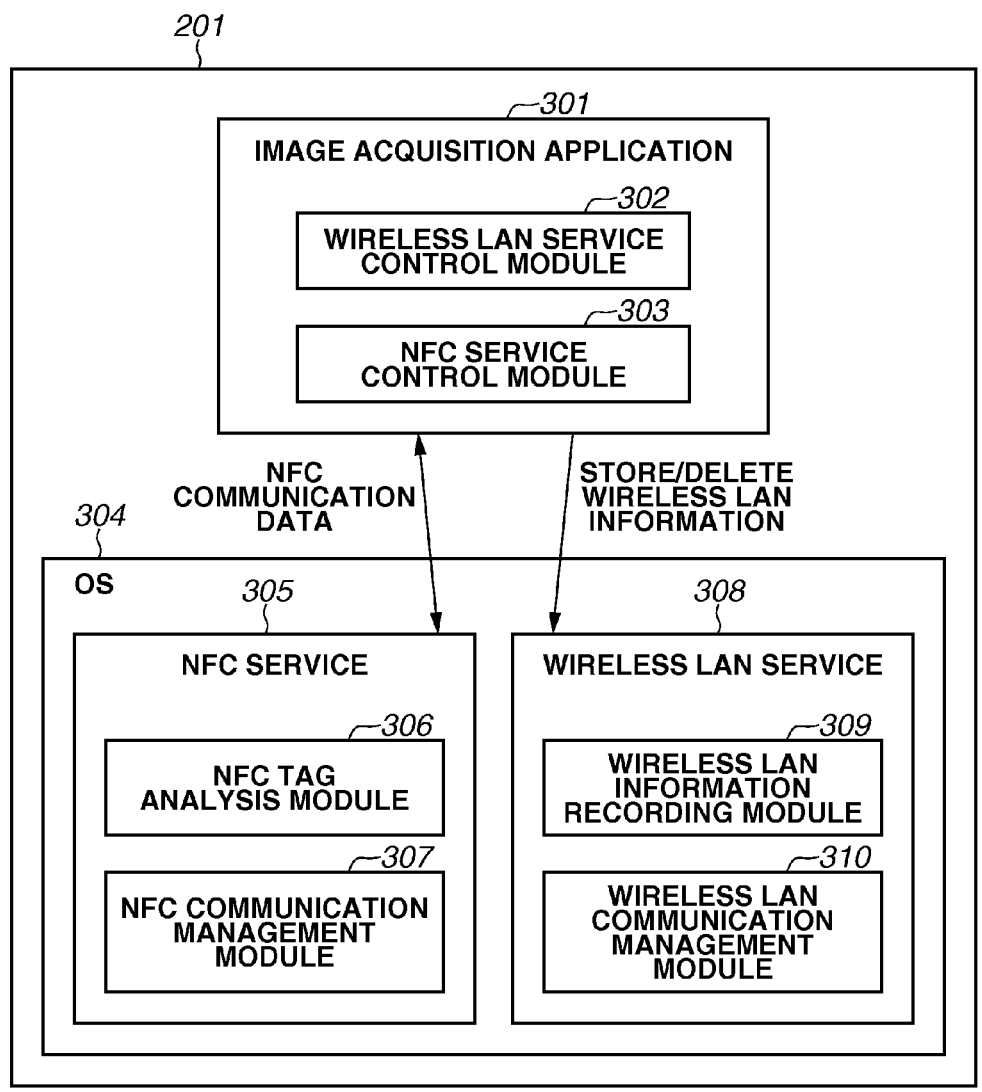

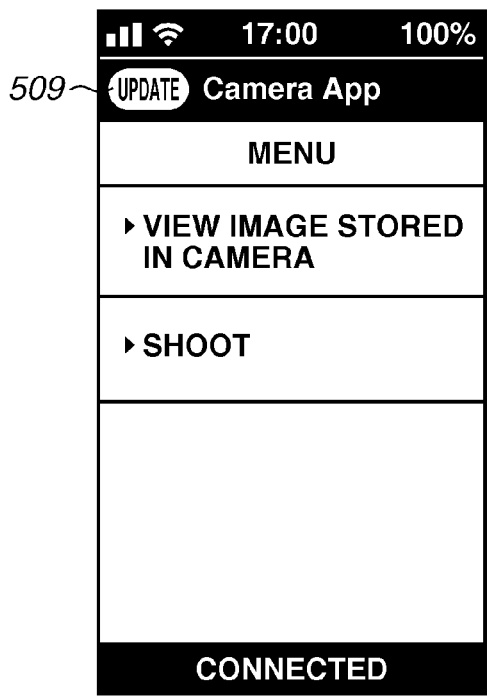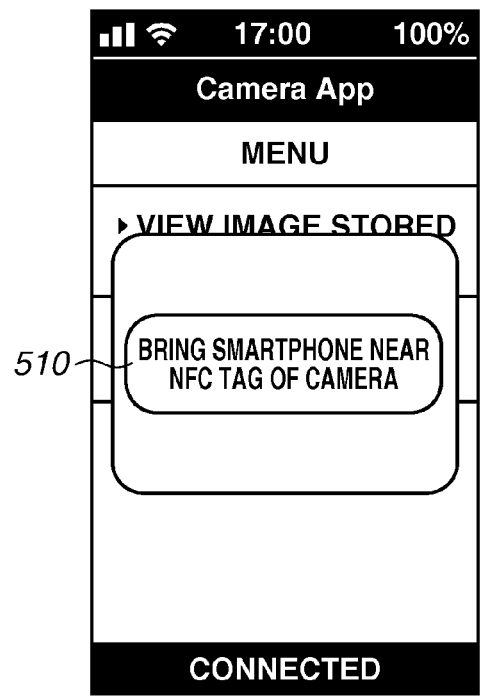

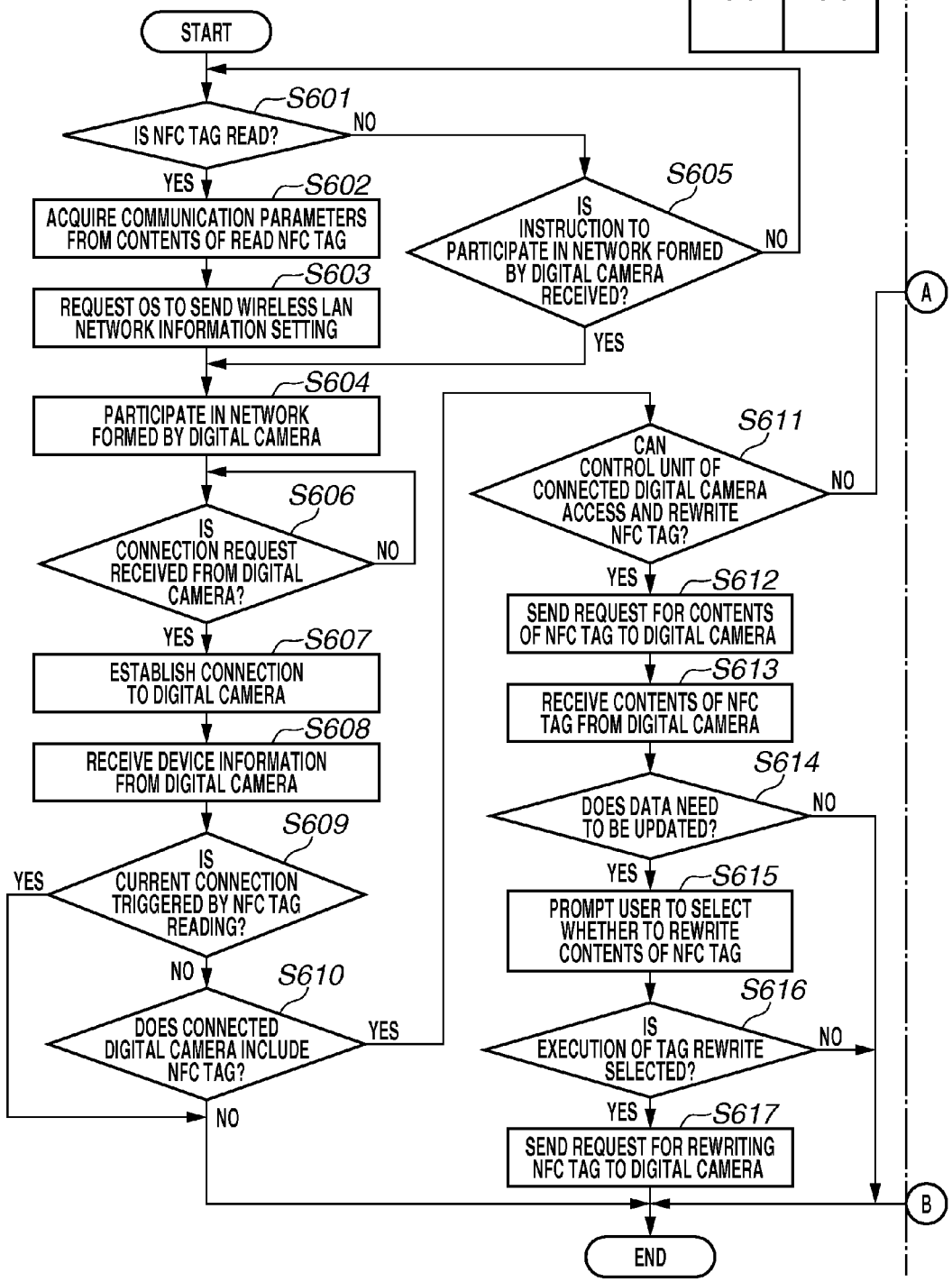

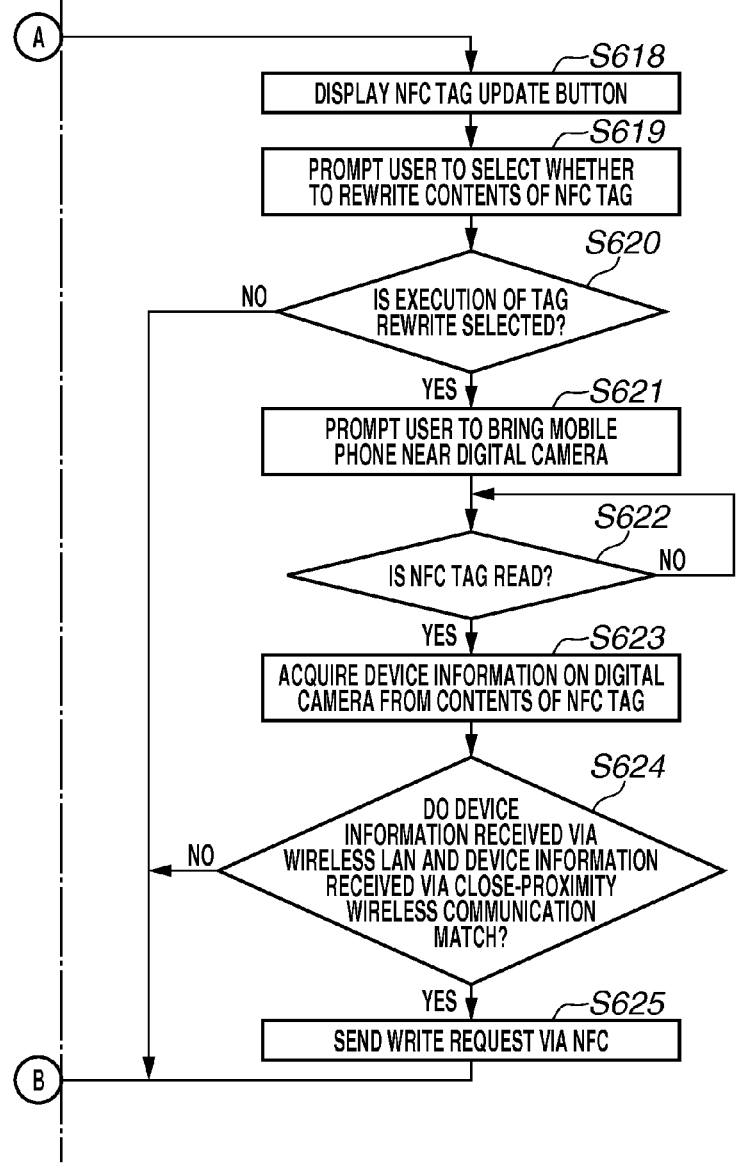

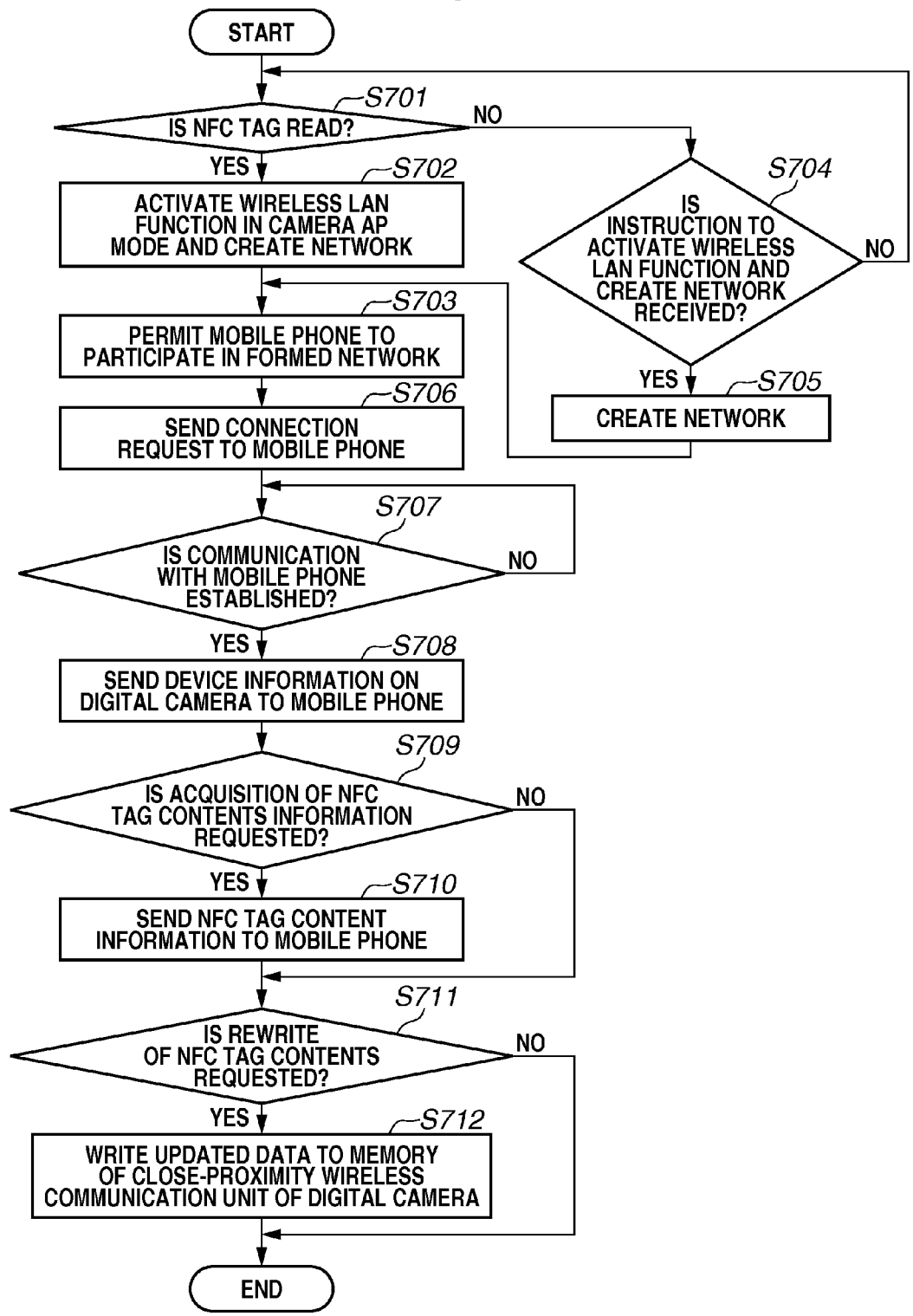

COMMUNICATION APPARATUS, METHOD FOR CONTROLLING COMMUNICATION APPARATUS, AND STORAGE MEDIUM

BACKGROUND

Field

Aspects of the present invention generally relate to a communication apparatus configured to communicate with other devices via a network.

Description of the Related Art

In recent years, close-proximity communication allowing short-range contactless wireless communication using an integrated circuit (IC) card or the like has been used in, for example, electronic commuter passes, electronic money, and the like. Further, mobile phones having functions of an electronic commuter pass and electronic money using close-proximity communication have become widespread.

Examples of existing standards for close-proximity communication include the International Organization for Standardization (ISO)/the International Electrotechnical Commission (IEC) 14443 and ISO/IEC 18092 (hereinafter, referred to as "near field communication (NFC)"). Among communication devices that can perform close-proximity communication according to the NFC standards or the like, a communication device that can output a radio frequency (RF) signal is called a reader/writer, and a communication device such as an IC card or an IC chip that can perform close-proximity communication in response to a signal from a reader/writer is called a tag.

The close-proximity communication technology is increasingly installed not only in mobile phones but also in digital cameras. In digital cameras, the technology is used not for an electronic money function but for a function (so-called "handover") that facilitates wireless local area network (LAN) connection. For example, Japanese Patent Application Laid-Open No. 2013-157736 discuses a system in which devices uses NFC to share communication parameters (service set identifier (SSID), password) required for a wireless LAN connection to establish a wireless LAN connection with ease.

In general, this handover function requires a dedicated application for controlling the communication with a digital camera, in addition to an operating system (OS) function. Therefore, a provider company providing the digital camera also provides an application required for the communication with the digital camera. In the handover described above, information for activating a corresponding application is recorded in advance in an NFC tag. A mobile phone reads the recorded information so as to automatically execute and control activation of the application and a handover by the application. As a result, a wireless LAN connection can be realized simply by bringing the devices into close proximity to each other.

However, the application may be sometimes upgraded due to addition of a function or the like or changed to a new application. In these cases, if information for activating the application is not updated together with the change of the application, the OS cannot identify the application to be activated. In other words, if the information stored in the NFC tag remains to be a previous version, there arises a problem that a newly installed application cannot be activated. This is not considered in Japanese Patent Application Laid-Open No. 2013-157736.

SUMMARY

According to an aspect of the present invention, a communication apparatus includes a first communication unit configured to receive data via a first communication from a recording area of an external apparatus configured to record data in the recording area readable by another device via the first communication, a second communication unit configured to connect with the external apparatus via a second communication different from the first communication, a determination unit configured to determine whether to rewrite data recorded in the recording area of the external apparatus based on information, acquired from the external apparatus via the second communication unit, about the data recorded in the recording area, and a notification unit configured to provide notification that the data recorded in the recording area is to be rewritten based on a result of the determination by the determination unit.

Further features of the present disclosure will become apparent from the following description of exemplary embodiments with reference to the attached drawings.

BRIEF DESCRIPTION OF THE DRAWINGS

FIG. 3 is a diagram illustrating a use case according to an exemplary embodiment.

FIGS. 5A to 5F each illustrate an example of a screen displayed on a display unit of a mobile phone according to an exemplary embodiment.

FIG. 6 (consisting of FIGS. 6A and 6B) is a flowchart illustrating an operation of a mobile phone according to an exemplary embodiment.

FIG. 7 is a flowchart illustrating an operation of a digital camera according to an exemplary embodiment.

DESCRIPTION OF THE EMBODIMENTS

Various exemplary embodiments, features, and aspects of the invention will be described in detail below with reference to the drawings.

The following exemplary embodiments are mere implementation examples and can be modified or changed as appropriate depending on various conditions or a configuration of an apparatus to which an exemplary embodiment of the present is to be applied. Further, the following exemplary embodiments can be combined as appropriate.

<Configuration of Digital Camera>

Figure 1A:
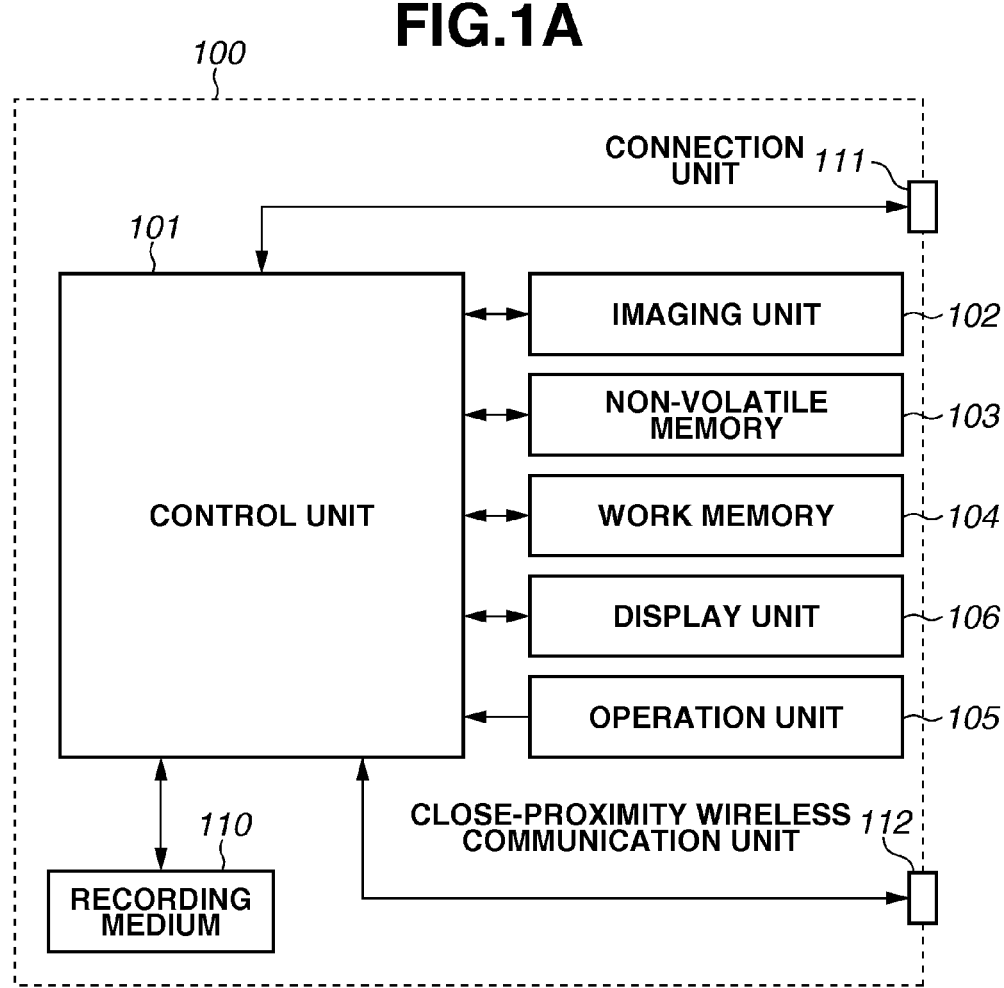
FIG. 1A is a block diagram illustrating a configuration of a digital camera according to an exemplary embodiment.

FIG. 1A is a block diagram illustrating an example of a configuration of a digital camera 100, which is an example of a communication apparatus according to the present exemplary embodiment. While the digital camera is described as an example of the communication apparatus in the present exemplary embodiment, the communication apparatus is not limited to the digital camera. For example, the communication apparatus may be any information processing apparatus such as a mobile media player, a tablet device, a personal computer, and the like.

A control unit 101 controls each unit of the digital camera 100 according to an input signal or a program described below. Instead of controlling the entire apparatus by the control unit 101, a plurality of pieces of hardware may share processing to control the entire apparatus.

An imaging unit 102 includes, for example, an optical lens unit, an optical system configured to control a diaphragm, zooming, focusing, and the like, and an image sensor configured to convert light (video image) introduced via the optical lens unit into electrical video signals. Commonly-used image sensors are complementary metal oxide semiconductor (CMOS) image sensors and charge coupled device (CCD) image sensors. The imaging unit 102 is controlled by the control unit 101 to convert object light focused by a lens included in the imaging unit 102 into an electric signal by the image sensor, perform noise reduction processing and the like, and output digital data as image data. In the digital camera 100 according to the present exemplary embodiment, image data is recorded in a recording medium 110 in compliance with the Design Rule for Camera File system (DCF).

A non-volatile memory 103 is an electrically erasable/recordable non-volatile memory, and stores programs to be executed by the control unit 101, which will be describe below, and the like.

A work memory 104 is used as a buffer memory for temporarily storing image data captured by the imaging unit 102, a memory for displaying images on a display unit 106, a work area of the control unit 101, and the like.

An operation unit 105 is used to receive a user instruction to the digital camera 100 from the user. The operation unit 105 includes, for example, a power button to be used by a user to give an instruction to turn on/off the digital camera 100, a release switch to be used to give an instruction to capture an image, and a reproduction button to be used to give an instruction to reproduce image data. The operation unit 105 further includes operation members such as a dedicated connection button for starting communication with an external device via a connection unit 111, which will be described below. Further, a touch panel formed on the display unit 106, which will be described below, is also included in the operation unit 105. The release switch includes switches SW1 and SW2. When the release switch is pressed to a so-called half-pressed state, the switch SW1 is turned on, whereby an instruction to perform preparation for image capturing, such as autofocus (AF) processing, automatic exposure (AE) processing, automatic white balance (AWB) processing, pre-flash (EF) processing, and the like, is received. Further, when the release switch is pressed to a so-called full-pressed state, the switch SW2 is turned on, whereby an instruction to capture an image is received.

The display unit 106 displays a viewfinder image at the time of image capturing, captured image data, a text for interactive operation, and the like. The display unit 106 does not have to be included in the digital camera 100. The digital camera 100 only needs to be connectable to an internal or external display unit 106 and have a display control function to control the display on the display unit 106.

The recording medium 110 can record image data output from the imaging unit 102. The recording medium 110 may be configured to be attachable to and detachable from the digital camera 100 or may be included in the digital camera 100. In other words, the digital camera 100 only needs to include a unit for accessing the recording medium 110.

The connection unit 111 is an interface for connecting the digital camera 100 to an external apparatus. The digital camera 100 according to the present exemplary embodiment can send and receive data to and from an external apparatus via the connection unit 111. For example, image data generated in the imaging unit 102 may be sent to an external apparatus via the connection unit 111. In the present exemplary embodiment, the connection unit 111 includes an interface for communicating with an external apparatus according to the Institute of Electrical and Electronics Engineers (IEEE) 802.11 standard, i.e., via a wireless local area network (LAN). The control unit 101 controls the connection unit 111 to realize wireless communication with an external apparatus. The communication method is not limited to the wireless LAN. An infrared communication method is another example. The connection unit 111 is an example of a first wireless communication unit.

A close-proximity wireless communication unit 112 includes, for example, an antenna for wireless communication, a modulation/demodulation circuit and a communication controller for processing wireless signals, and a memory that is an externally-readable recording area. The close-proximity wireless communication unit 112 outputs modulated wireless signals from the antenna and decomposes wireless signals received by the antenna, thereby realizing contactless close-proximity wireless communication. For example, the close-proximity wireless communication unit 112 realizes contactless close-proximity wireless communication according to the International Organization for Standardization (ISO)/the International Electrotechnical Commission (IEC) 18092 standard (so-called "near-field communication (NFC)"). The close-proximity wireless communication unit 112 of the digital camera 100 according to the present exemplary embodiment is a so-called NFC tag, and data is written into the memory in advance so that the data is externally readable even when no power is supplied to the control unit 101 of the digital camera 100. The close-proximity wireless communication unit 112 according to the present exemplary embodiment is located in a side portion of the digital camera 100.

The digital camera 100 can start communication and be connected with a mobile phone 200, which will be described below, when the close-proximity wireless communication unit 112 of the digital camera 100 and a close-proximity wireless communication unit of the mobile phone 200 are brought into close proximity to each other. To establish a connection using the close-proximity wireless communication units, the close-proximity wireless communication units do not always have to be brought into contact with each other. Since the close-proximity wireless communication units can communicate even from a certain distance from each other, in order to establish a connection between the close-proximity wireless communication units, the close-proximity wireless communication units only need to be brought near each other within a range where close-proximity wireless communication can be established. Hereinafter, the action of bringing the close-proximity wireless communication units near each other within a range where close-proximity wireless communication can be established is sometimes referred to as "bringing the close-proximity wireless communication units into close proximity to each other".

Further, communication is not started when the close-proximity wireless communication units are outside the range where close-proximity wireless communication can be established. Further, when the close-proximity wireless communication units are within the range where close-proximity wireless communication can be established and the digital camera 100 and the mobile phone 200 are communicating with each other and connected, if the close-proximity wireless communication units are separated to be outside the range where close-proximity wireless communication can be established, the communication connection is disconnected. The contactless close-proximity communication to be realized by the close-proximity wireless communication unit 112 is not limited to the NFC, and any other wireless communication may be adopted. For example, contactless close-proximity communication in compliance with the ISO/IEC 14443 standard may be adopted as the contactless close-proximity communication to be realized by the close-proximity wireless communication unit 112.

In the present exemplary embodiment, the communication speed of communication realized by the connection unit 111 is faster than the communication speed of communication realized by the close-proximity wireless communication unit 112, which will be described below. Further, the communicatable range of communication realized by the connection unit 111 is wider than the communicable range of the close-proximity wireless communication unit 112. Instead, since the communicable range of communication realized by the close-proximity wireless communication unit 112 is narrow, it is possible to limit communication partners, so that the processing such as encryption key exchange processing required in the communication realized by the connection unit 111 is not required. This enables more convenient communication than the communication using the connection unit 111.

The connection unit 111 of the digital camera 100 according to the present exemplary embodiment includes an access point (AP) mode, in which the connection unit 111 operates as an access point in an infrastructure mode, and a client (CL) mode, in which the connection unit 111 operates as a client in the infrastructure mode. The digital camera 100 according to the present exemplary embodiment can operate as a CL device in the infrastructure mode by operating the connection unit 111 in the CL mode. In the case where the digital camera 100 operates as a CL device, the digital camera 100 can participate in a network formed by an AP device in the vicinity by connecting to the AP device. Further, the digital camera 100 according to the present exemplary embodiment can operate as a limited AP (hereinafter "limited AP"), which is a type of an AP with more limited functions, by operating the connection unit 111 in the AP mode. When operating as a limited AP, the digital camera 100 forms a network by itself. A device in the vicinity of the digital camera 100 identifies the digital camera 100 as an AP device and can participate in the network formed by the digital camera 100. As described above, a program for causing the digital camera 100 to operate is stored in the non-volatile memory 103.

The digital camera 100 according to the present exemplary embodiment is a type of an AP but a limited AP that does not include a gateway function of transferring data received from a CL device to an internet provider or the like. Thus, the digital camera 100 cannot transfer data received from other devices that participate in the network formed by the digital camera 100 to a network such as the Internet.

Figure 1B:
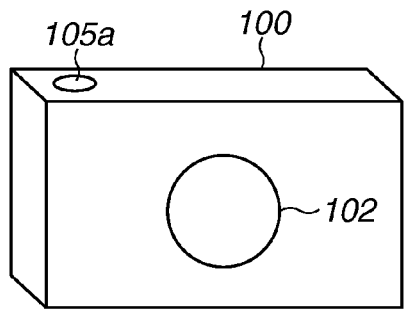
FIGS. 1B and 1C are external views illustrating a digital camera according to an exemplary embodiment.
Figure 1C:
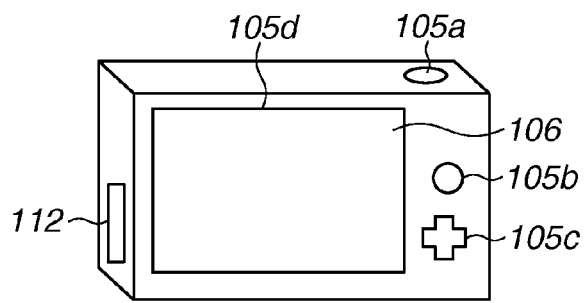

Next, an appearance of the digital camera 100 will be described. FIGS. 1B and 1C illustrate an example of an exterior of the digital camera 100. A release switch 105a, a reproduction button 105b, a direction key 105c, and a touch panel 105d are the operation members included in the operation unit 105 described above. Further, the display unit 106 displays an image obtained as a result of image capturing performed by the imaging unit 102. Further, the digital camera 100 according to the present exemplary embodiment includes an antenna portion of the close-proximity wireless communication unit 112 on a side surface of a camera housing. Close-proximity wireless communication with a device can be established by bringing the close-proximity wireless communication unit 112 and a close-proximity wireless communication unit of the device into close proximity within a certain distance from each other. In this way, contactless communication can be performed without a cable or the like, and a communication partner can be limited as desired by the user.

These are the descriptions of the digital camera 100.

<Configuration of Mobile Phone>

Figure 2:
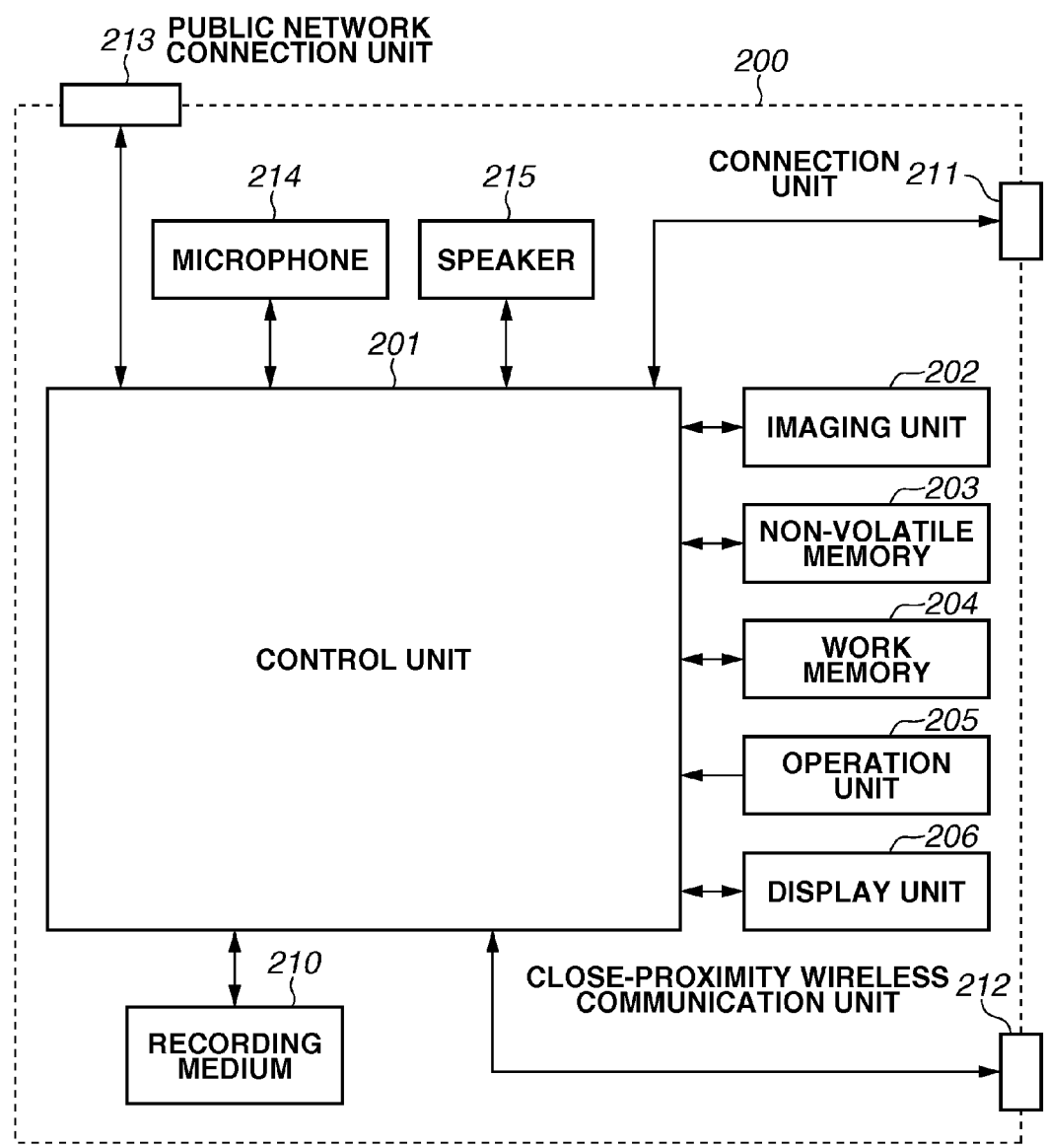
FIG. 2 is a block diagram illustrating a configuration of a mobile phone according to an exemplary embodiment.

FIG. 2 is a block diagram illustrating an example of a configuration of the mobile phone 200, which is an example of an information processing apparatus according to the present exemplary embodiment. While the mobile phone is described as an example of the information processing apparatus, the information processing apparatus is not limited to the mobile phone. For example, the information processing apparatus may be a digital camera, tablet device, personal computer, and the like having a wireless function.

A control unit 201 controls each unit of the mobile phone 200 according to an input signal or a program described below. Instead of controlling the entire apparatus by the control unit 201, a plurality of pieces of hardware may share processing to control the entire apparatus.

An imaging unit 202 converts object light focused by a lens included in the imaging unit 202 into an electric signal, performs noise reduction processing and the like, and outputs digital data as image data. The captured image data is stored in a buffer memory, subjected to a predetermined calculation in the control unit 201, and is then recorded in a recording medium 210.

A non-volatile memory 203 is an electrically erasable/recordable non-volatile memory. In the non-volatile memory 203, an operating system (OS) that is basic software to be executed by the control unit 201 and an application that cooperates with the OS to realize an applied function are recorded. Further, in the present exemplary embodiment, an application for communicating with the digital camera 100 is stored in the non-volatile memory 203.

A work memory 204 is used as a memory for displaying images on a display unit 206, a work area of the control unit 201, and the like.

An operation unit 205 is used to receive a user instruction to the mobile phone 200 from the user. The operation unit 205 includes, for example, a power button to be used by a user to give an instruction to turn on/off the mobile phone 200 and operation members such as a touch panel formed on the display unit 206.

The display unit 206 displays image data, a text for interactive operation, and the like. The display unit 206 does not have to be included in the mobile phone 200. The mobile phone 200 only needs to be connectable to the display unit 206 and have a display control function to control the display on the display unit 206.

The recording medium 210 can record image data output from the imaging unit 202. The recording medium 210 may be configured to be attachable to and detachable from the mobile phone 200 or may be included in the mobile phone 200. In other words, the mobile phone 200 only needs to include a unit for accessing the recording medium 210.

A connection unit 211 is an interface for connecting the mobile phone 200 to an external apparatus. The mobile phone 200 according to the present exemplary embodiment can send and receive data to and from the digital camera 100 via the connection unit 211. In the present exemplary embodiment, the connection unit 211 is an antenna, and the control unit 101 can connect to the digital camera 100 via the antenna. The control unit 101 may connect the mobile phone 200 to the digital camera 100 either directly or via an access point. As to a protocol for data communication, for example, the Picture Transfer Protocol over Internet Protocol (PTP/IP)

via a wireless LAN can be used. The communication with the digital camera 100 is not limited to the foregoing communication. For example, the connection unit 211 may include a wireless communication module such as an infrared communication module, a Bluetooth (registered trademark) communication module, and a wireless universal serial bus (USB). Furthermore, wired connection such as a USB cable, High-Definition Multimedia Interface (HDMI, registered trademark), and IEEE 1394 may be adopted.

A close-proximity wireless communication unit 212 is a communication unit configured to realize contactless close-proximity communication with other devices. The close-proximity wireless communication unit 212 includes an antenna for wireless communication and a modulation/demodulation circuit and a communication controller for processing wireless signals. The close-proximity wireless communication unit 212 outputs modulated wireless signals from the antenna and demodulates wireless signals received by the antenna, thereby realizing contactless close-proximity communication. In the present exemplary embodiment, the close-proximity wireless communication unit 212 realizes contactless communication in compliance with the ISO/IEC 18092 standard (so-called "NFC"). When receiving from another device a request for reading data, the close-proximity wireless communication unit 212 outputs response data based on data stored in the non-volatile memory 203. In the present exemplary embodiment, the mobile phone 200 operates via the close-proximity wireless communication unit 212 in a card reader mode, a card writer mode, and a peer-to-peer (P2P) mode defined by the NFC standard and acts mainly as an initiator. On the other hand, the digital camera 100 acts mainly as a target via the close-proximity wireless communication unit 112.

A public network connection unit 213 is an interface used to perform public wireless communication. The mobile phone 200 enables a phone call with another device via the public network connection unit 213. At this time, the control unit 201 inputs and outputs audio signals via a microphone 214 and a speaker 215 to realize the phone call. In the present exemplary embodiment, the public network connection unit 213 is an antenna, and the control unit 101 can connect the mobile phone 200 to a public network via the antenna. Alternatively, one antenna can be used as both the connection unit 211 and the public network connection unit 213.

These are the descriptions of the mobile phone 200.
<Software Configuration of Mobile Phone>

Next, a software configuration diagram illustrating the mobile phone 200 according to the first exemplary embodiment, will be described.

FIG. 3 is a software configuration diagram of the mobile phone 200. Various types of fixed data and firmware are recorded in the non-volatile memory 203 of the mobile phone 200.

In the recording medium 210, an OS 304 and an application are recorded. The OS 304 is basic software to be executed by the control unit 201. The application is applied software to be executed by the control unit 201. Further, an image acquisition application 301 (hereinafter, also referred to as "application 301") for connecting the mobile phone 200 to the digital camera 100 to acquire an image is recorded as applied software.

When a user turns on the power switch included in the operation unit 205 of the mobile phone 200, power is supplied to each unit of the mobile phone 200, and the control unit 201 reads the OS 304 from the recording medium 210, loads the OS 304 to the work memory 204, and executes the OS 304. Further, the control unit 201 controls each unit of the mobile phone 200 according to the OS 304 and an application installed on the OS 304. In the following description of FIG. 3, the operation of executing predetermined processing according to the application (or a function of the application, the OS, a service of the OS, and the like) by the control unit 201 will be referred to as "the application (or a function of the application, the OS, a service of the OS, and the like) performs predetermined processing".

The OS 304 not only includes the function of controlling each unit of the mobile phone 200 but also provides various types of services to the application. The OS 304 includes an NFC service 305 and a wireless LAN service 308 as feature functions of the present exemplary embodiment.

An NFC communication management module 307 of the NFC service 305 controls NFC communication using the close-proximity wireless communication unit 212. More specifically, the NFC service 305 receives data via NFC communication using the close-proximity wireless communication unit 212 and sends data in response to a request from the image acquisition application 301, and the like. The received data is provided to the image acquisition application 301, and the like.

An NFC tag analysis module 306 determines and analyzes the configuration of received data and changes the configuration to a data configuration suitable for the application. In this way, the data can be converted into a format interpretable by the application and then provided to the application, and vice versa.

Further, in general, data to be exchanged via the NFC communication complies with a NFC Data Exchange Format (NDEF). Thus, the NFC tag analysis module 306 has a function of determining whether received data is in a format that complies with the NDEF.

The wireless LAN service 308 performs the following functions using a wireless LAN communication management module 310. Specifically, the wireless LAN service 308 performs wireless LAN function on-off control and controls a search (scan) for a network in the vicinity, participation in a network, and wireless LAN data communication. The wireless LAN service 308 also controls provision of data acquired by communication using the wireless LAN to the application. The wireless LAN service 308 also controls transmission and reception of data via the wireless LAN in response to a request from the application. Furthermore, a wireless LAN information recording module 309 performs processing to manage storage, deletion, and the like, of communication parameters for wireless LAN communication. The storage and deletion of the communication parameters are also controlled by a request from the application.

The image acquisition application 301 has the following two functions. One of the functions is a function of connecting the mobile phone 200 to the digital camera 100 via the wireless LAN by use of the communication parameters of the wireless LAN that are received via close-proximity wireless communication. The other one is a function of receiving image data stored in the recording medium 110 of the digital camera 100 and of storing the received image data in the recording medium 210. Further, the image acquisition application 301 cooperates with the OS 304 by use of the following modules to realize services.

A wireless LAN service control module 302 performs processing to store the communication parameters for wireless LAN communication and also processing to instruct the OS 304 to perform wireless LAN on-off control.

An NFC service control module 303 performs processing to receive NFC communication data, analyze the received data, and extract the communication parameters for wireless LAN communication. Further, the control module 303 performs processing to instruct the OS 304 to send the NFC communication data to the digital camera 100 for proceeding connection processing.

<Description of Use Case>

Next, a use case according to the first exemplary embodiment will be described.

The digital camera 100 and the mobile phone 200 according to the present exemplary embodiment establish wireless LAN communication by use of close-proximity wireless communication. Hereinafter, a process of establishing wireless LAN communication by use of close-proximity wireless communication will be referred to as "wireless LAN handover".

Figure 4A:
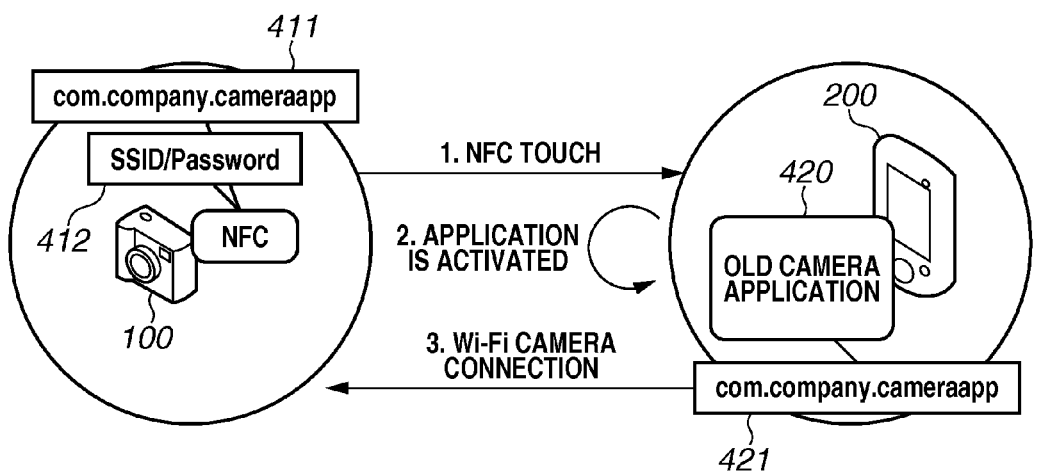
FIGS. 4A and 4B are conceptual diagrams each illustrating a software configuration of a mobile phone according to an exemplary embodiment.
Figure 4B:
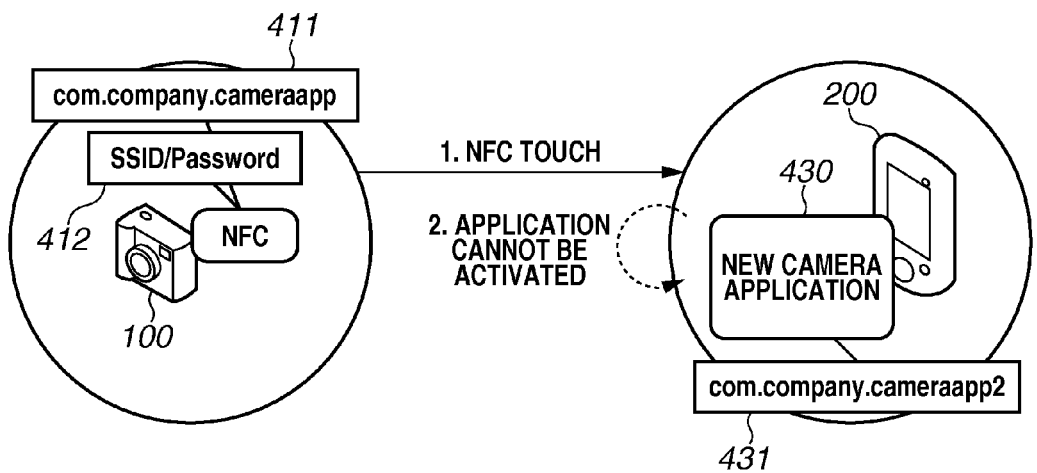

FIG. 4A illustrates a process flow in a case where the mobile phone 200 can activate the application to perform a handover. On the other hand, FIG. 4B illustrates an example of a case where the mobile phone 200 cannot activate the application.

First, FIG. 4A will be described.

(A1) NFC Touch

First, to start a wireless LAN handover, the user brings the close-proximity wireless communication unit 112 of the digital camera 100 and the close-proximity wireless communication unit 212 of the mobile phone 200 into close proximity to each other to start close-proximity wireless communication. Prior to the start of the close-proximity wireless communication, application activation information 411, which is information for activating an application for controlling the handover in the mobile phone 200, is recorded in the NFC tag of the digital camera 100. In the present exemplary embodiment, the character string "com.company.comeraapp" is the application activation information 411.

The mobile phone 200 reads the application activation information 411 from the NFC tag of the digital camera 100 by use of NFC. In response to the reading, the digital camera 100 activates the wireless LAN function and forms a network by use of the communication parameters recorded in the NFC tag.

(A2) Activation of Application

Next, the OS 304 of the mobile phone 200 refers to application identification information included in the read application activation information 411 to identify an application to be activated and determines whether the application to be activated is already installed. The application identification information is information for uniquely identifying the application installed in the OS 304 of the mobile phone 200. If the application to be activated is not installed, the OS 304 guides the user to a website for installing the application. More specifically, a web browser is started up to display an installation site. On the other hand, if the application to be activated is already installed, the application is activated. In the case illustrated in FIG. 4A, an old camera application 420 managed by the same character string as that of the application activation information 411 recorded in the NFC tag of the digital camera 100 is already installed. Thus, the OS 304 activates the old camera application 420 of the matched character string.

(A3) Wireless LAN Connection

When the application is activated, the application and the OS 304 cooperate to control the mobile phone 200 to participate in the network formed by the digital camera 100 by use of the communication parameters read in the section (A1).

By the foregoing process, the user can establish a wireless LAN connection between the devices simply by bringing the devices into close proximity to each other.

Next, FIG. 4B will be described.

(B1) NFC Touch

First, to start a wireless LAN handover, the user brings the close-proximity wireless communication unit 112 of the digital camera 100 and the close-proximity wireless communication unit 212 of the mobile phone 200 into close proximity to each other to start close-proximity wireless communication.

In the present exemplary embodiment, the contents recorded in the NFC tag of the digital camera 100 are the same as those in the case illustrated in FIG. 4A. More specifically, information for activating the old camera application 420 is recorded in the NFC tag of the digital camera 100.

The mobile phone 200 reads the application activation information 411 from the NFC tag of the digital camera 100 by use of NFC. In response to the reading, the digital camera 100 activates the wireless LAN function and forms a network by use of the communication parameters recorded in the NFC tag.

(B2) Activation of Application

Next, the OS 304 of the mobile phone 200 refers to the application identification information included in the read application activation information 411 to identify an application to be activated and determines whether the application to be activated is already installed.

In the case illustrated in FIG. 4B, a new camera application 430 is installed in the mobile phone 200, and the old camera application 420 is already deleted. The new camera application 430 is managed by the character string "com.company.comeraapp2" which is the identification information. Thus, the application identification information does not match the application identification information included in the application activation information 411 read from the NFC tag of the digital camera 100. Therefore, the new camera application 430, which is newly installed in the mobile phone 200, cannot be activated by the application activation information 411 recorded in the NFC tag of the digital camera 100. Accordingly, a handover cannot be conducted.

To activate the new camera application 430, the contents of the NFC tag of the digital camera 100 need to be updated.

Thus, when the new camera application installed in the mobile phone 200 according to the present exemplary embodiment is manually connected to the digital camera 100 via the wireless LAN, the contents of the NFC tag of the digital camera 100 are updated via the wireless LAN. In this way, the user can rewrite the contents of the NFC tag of the digital camera 100 so that the application that is currently installed in the mobile phone 200 can be activated.

Operations of the mobile phone 200 and the digital camera 100 for realizing an update of the NFC tag, will be described below.

<Operation of Mobile Phone>

FIGS. 5A to 5F each illustrate an example of a screen in a state where the application 301 is activated on the mobile phone 200 according to the present exemplary embodiment. The user of the mobile phone 200 can activate the application 301 by, for example, touching via the operation unit 205 an icon display area of the display unit 206 where an icon of the application 301 is displayed. Alternatively, the OS may automatically activate the application 301 by receiving an instruction to activate the application 301 from the digital camera 100 via close-proximity wireless communication.

Figure 5A:
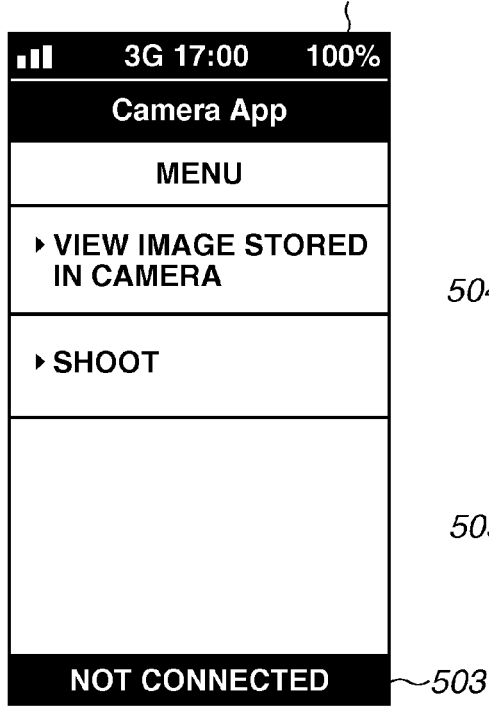

When the application 301 is activated, a screen 500 illustrated in FIG. 5A is displayed. A message indicating that no connection to the digital camera 100 is established is displayed on a message area 503 of the screen 500, whereby the user can recognize that no connection via the wireless LAN is established. Operations of the mobile phone 200 and the digital camera 100 at the time of establishment of wireless LAN communication between the mobile phone 200 and the digital camera 100 by the application 301 and the OS cooperating with each other, will be described.

FIG. 6 (consisting of FIGS. 6A and 6B) is a flowchart illustrating an operation of the mobile phone 200 according to the present exemplary embodiment. The control unit 201 of the mobile phone 200 reads the OS and the application 301 from the non-volatile memory 203, loads the OS and the application 301 to the work memory 204, and executes the OS and the application 301 to control each unit of the mobile phone 200 according to the OS and the application 301, thereby realizing the process illustrated in the flowchart.

Further, the process illustrated in the flowchart is started in response to an event that the power of the mobile phone 200 is turned on and activation of the OS 304 is completed.

In step S601, the control unit 201 determines whether the close-proximity wireless communication unit 212 of the mobile phone 200 and the close-proximity wireless communication unit 112 of the digital camera 100 are brought into close proximity to each other and reads the tag. The application 301 receives from the OS a notification indicating that the tag reading is performed. In the present exemplary embodiment, the determination of whether the tag read by the mobile phone 200 is the tag of the corresponding digital camera 100 may be performed by the OS or by the application 301. In the case where the application 301 is activated in response to reception of an instruction to activate the application 301 via close-proximity wireless communication as described above, the OS activates the application 301 by referring to the information for activating the application 301 that is included in the information read in step S601. Further, the application 301 may be activated by a user operation on the operation unit 205 prior to step S601. In any case, no wireless LAN communication with the digital camera 100 is established at this time, so that the screen 500 illustrated in FIG. 5A is displayed on the screen of the mobile phone 200.

First, the case where the control unit 201 determines that the tag is read will be described. In this case (YES in step S601), the processing proceeds to step S602.

In step S602, the control unit 201 acquires, according to the control by the OS, communication parameters (SSID and password in the present exemplary embodiment) of the network formed by the digital camera 100 in the camera AP mode from the contents of the NFC tag acquired by the tag reading.

In step S603, the control unit 201 requests, according to the control by the application 301, the OS to send a wireless LAN network information setting based on the SSID and the password acquired in step S602. In this way, the mobile phone 200 can participate in the network as soon as the digital camera 100 forms the network in camera AP mode.

Then, in step S604, the control unit 201 participates, according to the control by the OS, in the network formed by the digital camera 100 according to the instruction given in step S603. Then, the processing proceeds to step S606.

Next, before describing the processes performed in step S606 and subsequent steps, the case where the control unit 201 determines in step S601 that no tag reading is performed is described below. In this case (NO in step S601), the processing proceeds to step S605.

In step S605, the control unit 201 determines, according to the control by the OS, whether an instruction to participate in the network of the digital camera 100 is received via the operation unit 205. More specifically, the control unit 201 determines whether beacons in the vicinity are scanned and selection of an SSID included in the listed beacons and input of a password are performed in response to a menu operation by the user via the operation unit 205. If the control unit 201 determines that no instruction to participate in the network of the digital camera 100 is received (NO in step S605), the processing returns to step S601. On the other hand, if the control unit 201 determines that an instruction to participate in the network of the digital camera 100 is received (YES in step S605), the processing proceeds to step S604, and the mobile phone 200 participates in the network.

Next, the processes performed in step S606 and subsequent steps will be described.

If the mobile phone 200 participates in the network of the digital camera 100, then in step S606, the control unit 201 determines, according to the control by the OS, whether a connection request is received from the digital camera 100. The digital camera 100 according to the present exemplary embodiment is configured to send a connection request to a device participating in a network formed by the digital camera 100.

In step S606, if the control unit 201 determines that no connection request is received (NO in step S606), the process in step S606 is repeated to wait for a connection request. On the other hand, if the control unit 201 determines that a connection request is received (YES in step S606), the processing proceeds to step S607.

In step S607, the control unit 201 establishes communication between the digital camera 100 and the mobile phone 200 via the wireless LAN according to the control by the OS.

If communication with the digital camera 100 is established, then in step S608, the control unit 201 receives device information sent from the digital camera 100 according to the control by the application 301. The device information includes the camera model name, property information, and specification information such as supported functions.

In step S609, the control unit 201 determines, according to the control by the application 301, whether the current connection to the digital camera 100 is triggered by the NFC tag reading or a user operation on a menu screen displayed on the display unit 106. More specifically, the control unit 201 determines whether the processing proceeded to step S609 because the determination result in step S601 is "YES" or because the determination result in step S605 is "YES". If the control unit 201 determines that the connection is triggered by the tag reading (YES in step S609), the process of the flowchart is ended, and the processing shifts to a process corresponding to the use of a service via the wireless LAN. This is due to the following two reasons. First, in the case where the application is triggered by the tag reading to establish wireless LAN communication, it is not necessary to rewrite the contents of the NFC tag of the close-proximity wireless communication unit 112 of the digital camera 100 because the contents of the NFC tag are already the application identification information of the application. Second, in the case where the trigger of the activation of the application is not the tag reading, i.e., in the case where the tag reading is performed when the application has already been activated by a user instruction, the application identification information of the application is not always included in the contents of the NFC tag. However, a possible situation in which wireless LAN communication is conveniently established by use of the NFC tag may be a situation in which, for example, a connection to a camera of a friend is conveniently established. In such a case, the processing to rewrite the contents of the tag should not be performed. Thus, in the present exemplary embodiment, the subsequent steps are switched not based on the condition of whether the activation of the application is triggered by the tag reading or a user instruction but based on the condition of whether the wireless LAN connection is triggered by the tag reading or a user instruction.

On the other hand, if the control unit 201 determines that the connection is triggered by a method other than the tag reading, it is determined that the connection is triggered by the menu operation in step S605. In this case (NO in step S609), the processing proceeds to step S610.

In step S610, the control unit 201 determines, according to the control by the application 301, whether the connected digital camera 100 includes a NFC tag. In the present exemplary embodiment, the control unit 201 determines whether the camera includes an NFC tag by referring to the property information of the digital camera 100 that is acquired in step S608. In a case where the control unit 201 determines that the camera does not include a NFC tag, activation of the application 301 via NFC has not been possible. Thus, in this case (NO in step S610), the process of the flowchart is ended, and the processing shifts to a process corresponding to the use of a service via the wireless LAN.

On the other hand, if the control unit 201 determines that the camera includes an NFC tag (YES in step S610), the processing proceeds to step S611.

In step S611, the control unit 201 determines, according to the control by the application 301, whether the control unit 101 of the connected digital camera can access and rewrite the NFC tag, because the control unit and the NFC tag of the connected digital camera are not always electrically connected to each other as in the digital camera illustrated in FIG. 1. If the control unit and the NFC tag are not connected to each other, even if the NFC tag is embedded in the housing of the digital camera, the digital camera cannot access the NFC tag. Thus, to rewrite the NFC tag, the NFC tag needs to be rewritten externally via NFC communication. On the other hand, in the case where the control unit can access the NFC tag as in the digital camera 100 illustrated in FIG. 1, the digital camera 100 can update the contents of the NFC tag if an instruction to rewrite the NFC tag is given to the digital camera 100 via the connected wireless LAN. Thus, the digital camera 100 and the mobile phone 200 do not have to be brought into close proximity to each other.

In the following description, first, the case where the control unit 201 determines in step S611 that the control unit 101 of the connected digital camera can access and rewrite the NFC tag. In this case (YES in step S611), the processing proceeds to step S612.

In step S612, the control unit 201 sends a request for the contents of the NFC tag of the digital camera 100 to the digital camera 100 according to the control by the application 301 and the OS. The request may be a request for receiving all the data or a request for receiving only the application identification information by designating the application identification information.

Next, in step S613, the control unit 201 receives, according to the control by the application 301 and the OS, from the digital camera 100 the contents of the NFC tag that are requested in step S609.

While the case where the mobile phone 200 acquires the information by requesting the digital camera 100 to send the information in steps S612 to S613, has been described as an example, the information may be acquired by the following process. Specifically, the digital camera 100 may be configured to automatically send the contents of the NFC tag to the mobile phone 200 when the digital camera 100 and the mobile phone 200 participate in the same network. By receiving the contents, the mobile phone 200 identifies the contents of the NFC tag of the digital camera 100.

In step S614, the control unit 201 determines, according to the control by the application 301, whether the data needs to be updated based on the contents of the NFC tag that are received in step S613. In the determination, for example, the control unit 201 checks whether the application identification information included in the information acquired in step S602 via NFC matches the application identification information activated in the mobile phone 200. If they do not match, the control unit 201 determines that the data needs to be updated. On the other hand, if they match, the control unit 201 determines that the data does not need to be updated. In the determination, a method of comparing generations of corresponding applications may be adopted. In this case, generation information of the corresponding application is stored in advance together with the corresponding application identification information stored as the contents of the NFC tag of the close-proximity wireless communication unit 112 of the digital camera 100, and which generation the corresponding application belongs is defined in the application. Then, in step S611, the application activated on the mobile phone 200 compares the generation of the application thereof with the application generation specified by the contents of the NFC tag of the digital camera 100 that are acquired by the tag reading, and only if the generation of the application that is activated by the mobile phone 200 is newer than that of the NFC tag of the digital camera 100, the NFC tag rewrite processing is performed. In the case where this method is adopted, once the data is updated to the new application identification information, the data will not be updated to the old application identification information, so that it can be expected that the new application will be used positively by the user.

If the control unit 201 determines that the data does not need to be updated (NO in step S614), the process of the flowchart is ended. On the other hand, if the control unit 201 determines that the data needs to be updated (YES in step S614), the processing proceeds to step S615.

Figure 5B:
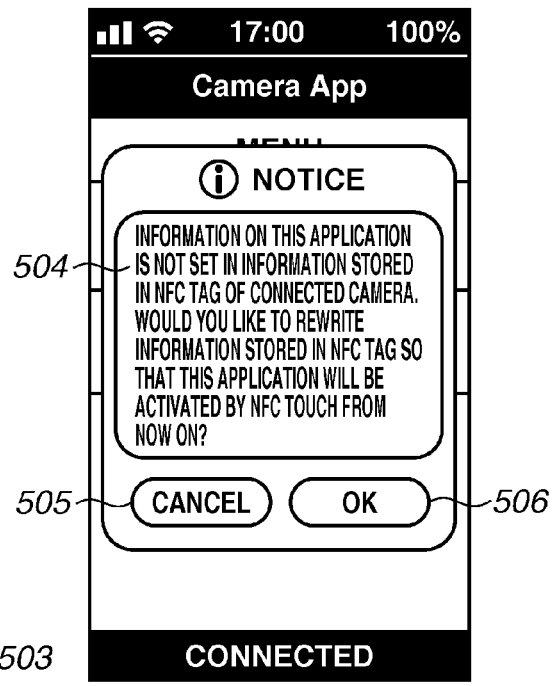

In step S615, the control unit 201 provides, according to the control by the application 301, the user with an indication that the control unit 201 determines that the contents of the NFC tag need to be updated. For example, as illustrated in FIG. 5B, a dialog 504 for calling the user's attention is superimposed and displayed on the screen 500. The dialog 504 includes a message indicating that the information of the NFC tag does not include information for activating the currently-activated application 301. Further, together with this message, a message indicating that the information of the NFC tag of the digital camera 100 can be rewritten to the information for activating the currently-activated application 301 is also displayed. In this way, the user is prompted to select whether to rewrite the contents of the NFC tag.

In step S616, the control unit 201 determines, according to the control by the application 301, a user response to the screen displayed in step S613. If a cancel button 505 is tapped (NO in step S616), the control unit 201 determines that an instruction not to rewrite the NFC tag is given, and the screen is changed to the screen illustrated in FIG. 5D to end the process of the flowchart. Then, the processing shifts to a process corresponding to the use of a service via the wireless LAN. As an example of the services, in the present exemplary embodiment, the user can receive and browse a list of thumbnails of images recorded in the recording medium 110 of the digital camera 100 by selecting the menu "View image stored in camera" illustrated in FIG. 5D. Further, the user can select a desired image from the list and receive the image. Further, the user can remotely control an image capturing operation of the digital camera 100 from the mobile phone 200 by selecting the menu "Shoot" illustrated in FIG. 5D. More specifically, the user can remotely give an instruction regarding the settings of zooming and focusing, and release via a graphic user interface (GUI) displayed on the mobile phone 200, and the digital camera 100 receives the instruction and changes image capturing parameters according to the instruction to adjust the lens position and execute image capturing processing. On the other hand, if an OK button 506 is tapped (YES in step S616), the control unit 201 determines that an instruction to rewrite the NFC tag is given, and the processing proceeds to step S617.

Figure 5C:
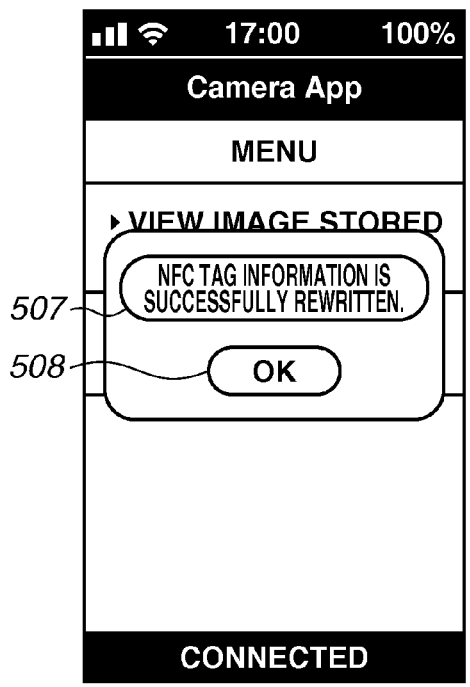
Figure 5D:
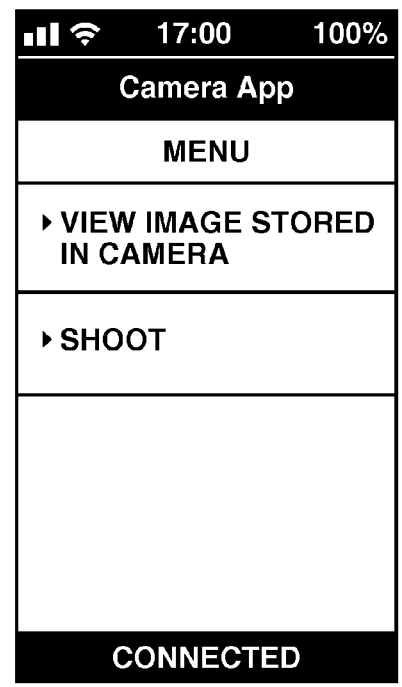

In step S617, the control unit 201 sends a request for rewriting the NFC tag to the digital camera 100 according to the control by the application 301. The rewrite request includes a command indicating an instruction to the digital camera 100 as well as updated data that is data to be written into the tag. The updated data includes the application identification information of the mobile phone 200. In the digital camera 100 having received the rewrite request, the control unit 101 writes the updated data received via the wireless LAN to the memory included in the close-proximity wireless communication unit 112. When the update of the activation information is completed, a notification indicating the completion of the update may be received from the digital camera 100. In this case, for example, a dialog 507 including a message indicating that the rewrite is successfully completed is displayed on the display unit 206 of the mobile phone 200 as illustrated in FIG. 5C, whereby the user can recognize that the application 301 can now be activated by NFC touch. At the tap of a displayed OK button 508, the dialog 507 disappears, and the screen is changed to a screen illustrated in FIG. 5D. Then, the process of the flowchart is ended, and the processing shifts to a process corresponding to the use of a service via the wireless LAN.

The case has been described above in which the control unit 201 determines in step S611 that the control unit 101 of the connected digital camera can access and rewrite the NFC tag.

Next, the case where the control unit 201 determines that the control unit 101 of the connected digital camera cannot access and rewrite the NFC tag, will be described. In this case (NO in step S611), the processing proceeds to step S618.

In step S618, the control unit 201 displays, according to the control by the application 301, a button for giving an instruction to start the processing to update the NFC tag of the connected digital camera 100, on the display unit 206. As to the display form of the button, for example, an update button 509 displayed on the screen illustrated in FIG. 5E is displayed. The user can select the update button 509 by tapping to give an instruction to execute tag rewrite processing. If the selection of the update button 509 is received, the processing proceeds to step S619.

In step S619, the control unit 201 prompts, according to the control by the application 301 and the OS, the user to select whether to execute the rewrite. In the present exemplary embodiment, a screen similar to the screen illustrated in FIG. 5B is displayed. The selection of the update button 509 is required prior to the display of the screen illustrated in FIG. 5B for the following reason. Specifically, in the case where the control unit 201 determines in step S611 that the control unit 101 of the connected digital camera cannot access and rewrite the NFC tag, the information recorded in the NFC tag of the digital camera does not always need to be updated. Therefore, in the present exemplary embodiment, unless the user actively gives an update instruction to update the information, the screen illustrated in FIG. 5B is not displayed.

In step S620, the control unit 201 receives an instruction from the user according to the control by the application 301 and the OS. If the cancel button 505 is selected (NO in step S620), the screen is changed to the screen illustrated in FIG. 5E, and the process of the flowchart is ended. Even after the flowchart is ended, the update button 509 remains displayed on a top screen of the application 301 until the wireless LAN communication with the currently-connected digital camera is disconnected. On the other hand, if the OK button 506 is selected (YES in step S620), the processing proceeds to step S621.

In step S621, the control unit 201 prompts, according to the control by the application 301, the user to bring the mobile phone 200 near the digital camera 100 to execute the rewrite. For example, a dialog 510 including a message as illustrated in FIG. 5F is displayed on the display unit 206.

In step S622, the control unit 201 determines whether the close-proximity wireless communication unit 212 of the mobile phone 200 and the close-proximity wireless communication unit 112 of the digital camera 100 are brought into close proximity to each other to read the tag. If the control unit 201 determines that no tag reading is performed (NO in step S622), the process in step S622 is repeated to wait for the tag to be read. On the other hand, if the control unit 201 determines that tag reading is performed (YES in step S622), the processing proceeds to step S623.

In step S623, the control unit 201 acquires, according to the control by the OS, device information on the digital camera 100 from the contents of the NFC tag acquired by the tag reading. The device information includes the camera model name, property information, and specification information such as supported functions.

In step S624, the control unit 201 compares, according to the control by the application 301, the device information received in step S608 via the wireless LAN with the device information received in step S623 via close-proximity wireless communication. In this way, the control unit 201 confirms that the digital camera brought into close proximity is the connected digital camera. As a result of the comparison, if the control unit 201 determines that the device information received via the wireless LAN does not match the device information received via close-proximity wireless communication (NO in step S624), an error message is displayed, and the flowchart is ended.

On the other hand, if the control unit 201 determines that the device information received via the wireless LAN matches the device information received via close-proximity wireless communication (YES in step S624), the processing proceeds to step S625.

In step S625, the control unit 201, according to the control by the application 301 and the OS, sends a write request to the close-proximity wireless communication unit 112 of the digital camera 100 via the close-proximity wireless communication unit 212. As in step S617, the write request includes updated data including application identification information of the mobile phone 200. As a result, the contents of the NFC tag of the digital camera 100 become the same as those in the case where the data is rewritten by the digital camera 100 in response to the process performed in step S617.

The operation of the mobile phone 200 according to the present exemplary embodiment has been described above.

<Operation of Digital Camera>

FIG. 7 is a flowchart illustrating the operation of the digital camera 100 according to the present exemplary embodiment. The control unit 101 of the digital camera 100 reads a control program from the non-volatile memory 103, loads the control program to the work memory 104, and executes the control program to control each unit of the digital camera 100 according to the control program, thereby realizing the process illustrated in the flowchart.

Further, the process of the flowchart is started in response to an event that the power of the digital camera 100 is turned on and the activation of the control program is completed.

In step S701, the control unit 101 determines whether the contents of the NFC tag of the close-proximity wireless communication unit 112 of the digital camera 100 are read. When close-proximity wireless communication with another device is performed, the close-proximity proximity wireless communication unit 112 of the digital camera 100 notifies the control unit 101 of information indicating that an event occurs. By receiving the notification, the control unit 101 can detect that the close-proximity wireless communication is performed. If the control unit 101 determines that the tag is read (YES in step S701), the processing proceeds to step S702. On the other hand, if the control unit 101 determines that the tag is not read (NO in step S701), the processing proceeds to step S704.

In step S702, the control unit 101 sets the digital camera 100 to the camera AP mode, activates the wireless LAN function, and starts transmission of a beacon to form a network. The beacon transmitted at this time includes the communication parameters recorded in the NFC tag in step S701.

In step S703, the control unit 101 receives a network participation request from the mobile phone 200 and permits the mobile phone 200 to participate in the network.

On the other hand, in step S704, the control unit 101 determines whether a user instruction to activate the wireless LAN function and form a network is received through a menu operation by the user via the operation unit 105. If the control unit 101 determines that no instruction is received (NO in step S704), the processing returns to step S701. On the other hand, if the control unit 101 determines that an instruction is received (YES in step S704), the processing proceeds to step S705.

In step S705, the control unit 101 sets the digital camera 100 to the camera AP mode, activates the wireless LAN function, and starts transmission of a beacon to form a network. The beacon transmitted at this time includes communication parameters that are randomly generated at the time of receiving the instruction. Then, the processing proceeds to step S703.

In step S705, in addition to the formation of the network, the randomly-generated communication parameters are controlled to be displayed on the display unit 106, because in this case, the mobile phone 200 needs to be operated by the user to participate in the network of the digital camera 100. The user of the mobile phone 200 can select a network and input a password by referring to the communication parameters displayed on the display unit 106 of the digital camera 100.

Next, in step S706, the control unit 101 identifies the mobile phone 200 participating in the same network as a result of the processing performed in step S703 or S705 and sends a connection request to the identified mobile phone 200. Then, in step S707, the control unit 101 waits for establishment of communication with the mobile phone 200 (NO in step S707).

If communication with the mobile phone 200 via the wireless LAN is established (YES in step S707), then in step S708, the control unit 101 sends the device information of the digital camera 100 to the mobile phone 200 in response to a request from the mobile phone 200. As described above, the information includes the camera model name, property information, and specification information such as supported functions.

After the processing proceeds up to this point, the digital camera 100 performs processing in response to a request from the mobile phone 200 to perform necessary processing for the NFC rewrite processing.

In step S709, the control unit 101 determines whether acquisition of NFC tag content information is requested by the mobile phone 200. If the control unit 101 determines that acquisition of NFC tag content information is requested (YES in step S709), then in step S710, the control unit 101 sends NFC tag content information to the mobile phone 200. As described above, all the data may be sent as the NFC tag content information, or only the application identification information among the data may be sent in response to designation specified in the request from the mobile phone 200. While the description has been given in which the digital camera 100 sends information in response to a request from the mobile phone 200 in steps S709 to S710, the digital camera 100 may automatically send the information in place of the processes performed in steps S709 to S710.

Next, in step S711, the control unit 101 determines whether the mobile phone 200 requests a rewrite of the NFC tag contents. If the control unit 101 determines that a rewrite of the NFC tag contents is requested (YES in step S711), then in step S712, the control unit 101 performs control to write the updated data received from the mobile phone 200 to the memory of the close-proximity wireless communication unit 112 together with the rewrite request.

The operation of the digital camera 100 according to the present exemplary embodiment has been described above. In a case of externally rewriting the NFC tag contents via NFC, since the control unit and the NFC tag of the digital camera 100 are not electrically connected to each other, rewrite processing is performed between the NFC tag and the mobile phone 200 independently from the control by the digital camera 100. The rewrite processing is a well-known technique, so that description thereof is omitted.

The description has been given above in which the process of updating the contents of the NFC tag of the digital camera 100 in response to an instruction from the mobile phone 200. As a result of the above-described process, the information for activating the application activated on the connected mobile phone 200 is written into the NFC tag of the digital camera 100. This enables the application to be activated automatically in next and subsequent connections by simply bringing the digital camera 100 and the mobile phone 200 into close proximity to each other.

Other Exemplary Embodiments

In the present exemplary embodiment described above, the subsequent steps are switched in step S609 in FIG. 6 based on the condition of whether the wireless LAN connection is triggered by the tag reading or a user instruction. In place of the processing performed in step S609 in FIG. 6, or in addition to the processing performed in step S609 in FIG. 6, the condition of whether the activation of the application is triggered by the tag reading or a user instruction may be used, because there may be a situation in which the user desires to update the contents of the NFC tag as in a case where the trigger is the reading of the NFC tag of the digital camera of the user. In this case, the processing may proceed to step S610 if it is determined that the activation of the application is triggered by a user instruction. On the other hand, the process may be ended if it is determined that the activation of the application is triggered by the tag reading.

Further, in the above-described exemplary embodiment, the update button 509 in FIG. 5E is displayed only in the case where it is determined that the control unit 101 of the digital camera 100 cannot access the NFC tag. Alternatively, for example, when it is determined that the control unit 101 of the digital camera 100 can access the NFC tag and the screen illustrated in FIG. 5B is displayed, even if the update is cancelled, the screen may be changed to the screen illustrated in FIG. 5E to display the update button 509. In this way, even if the user cancels the update, the user can give an update instruction again by use of the update button, as there may be a case where, for example, the user desires to use a communication service prior to the update of the NFC tag and postpones the update of the NFC tag update.

While in the above-described exemplary embodiments, the system is described in which the mobile phone 200 receives image data from the digital camera 100, this is not limited thereto. For example, image data captured and acquired by the imaging unit 202 of the mobile phone 200 may be sent to the digital camera 100.

Aspects of the present invention can be realized by providing a program realizing one or more functions according to the foregoing exemplary embodiments to a system or apparatus via a network or storage medium so that the program is read and executed by one or more processors of a computer of the system or apparatus. The present invention can also be realized by a circuit (e.g., application specific integrated circuit (ASIC)) that realize one or more functions.

Other Embodiments

Additional embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-165970, filed Aug. 18, 2014, which is hereby incorporated by reference herein in its entirety.

What is claimed is:

1. A communication apparatus comprising:
   a first communication unit configured to receive data via a first communication from a recording area of an external apparatus configured to record data in the recording area readable by another device via the first communication;
   a second communication unit configured to connect with the external apparatus via a second communication different from the first communication, a communication range of the second communication is longer than a communication range of the first communication;
   a memory configured to store an application;
   a control unit configured to control the second communication by executing the application;
   wherein the control unit determines whether the data recorded in the recording area includes information for causing the communication apparatus to execute the application; and
   wherein the control unit provides notification that the data recorded in the recording area is to be rewritten to the information for causing the communication apparatus to execute the application in a case where the data recorded in the recording area does not include the information for causing the communication apparatus to execute the application, and does not provide the notification in a case where the data includes the information for causing the communication apparatus to execute the application.

2. The communication apparatus according to claim 1, wherein in a case where a trigger for starting the second communication is an event that the data is read from the recording area via the first communication, the notification unit the control unit does not provide notification that the data in the recording area is to be rewritten.

3. The communication apparatus according to claim 1, wherein a command for causing the communication apparatus to start processing to connect the communication apparatus and the external apparatus via the second communication is recorded in the recording area, and
   wherein the communication apparatus further comprises a control unit configured to perform control to establish the second communication with the external apparatus in response to an event that the command is read via the first communication.

4. The communication apparatus according to claim 3, wherein the first communication unit sends an instruction to rewrite the command among the data recorded in the recording area to the external apparatus via the first communication.

5. The communication apparatus according to claim 3, wherein the second communication unit sends an instruction to rewrite the command among the data recorded in the recording area to the external apparatus via the second communication.

6. The communication apparatus according to claim 3, wherein a communication parameter for connecting the communication apparatus and the external apparatus via the second communication is recorded in the recording area and is read together with the command.

7. The communication apparatus according to claim 3, wherein the command is a command to activate an application configured to cause the control unit to execute processing to connect the communication apparatus and the external apparatus via the second communication.

8. The communication apparatus according to claim 7,
wherein information indicating a generation of the application to be activated by the command is recorded in the recording area,
wherein the second communication unit acquires, via the second communication, the information indicating the generation of the application to be activated by the command among the data recorded in the recording area, and
wherein the control unit determines whether to rewrite the data recorded in the recording area based on the information indicating the generation of the application to be activated by the command.

9. The communication apparatus according to claim 1, wherein the second communication unit receives image data from the external apparatus via the second communication.

10. The communication apparatus according to claim 1, further comprising an imaging unit configured to capture an image of an object to generate image data,
wherein the second communication unit sends the image data to the external apparatus via the second communication.

11. A communication apparatus comprising:
a first communication unit configured to receive data via a first communication from a recording area of an external apparatus configured to record data in the recording area readable by another device via the first communication;
a second communication unit configured to connect to the external apparatus via a second communication different from the first communication, a communication range of the second communication is longer than a communication range of the first communication; and
a memory configured to store an application;
a control unit configured to control the second communication by executing the application;
wherein the control unit determines whether the information, acquired from the external apparatus via the second communication unit, about the data recorded in the recording area includes information for causing the communication apparatus to execute the application,
wherein the control unit controls the second communication unit to send a signal via the second communication instructing the external apparatus to rewrite the data recorded in the recording area to the information for causing the communication apparatus to execute the application in a case where the data recorded in the recording area does not include the information for causing the communication apparatus to execute the application, and does not control the second communication unit to send the signal in a case where the data includes the information for causing the communication apparatus to execute the application.

12. A method for controlling a communication apparatus configured to connect via a second communication different from a first communication to an external apparatus configured to record data in a recording area externally readable via the first communication, a communication range of the second communication is longer than a communication range of the first communication, the method comprising:
executing an application;
acquiring data, via the second communication, from the recording area;
determining whether the data recorded in the recording area includes information for causing the communication apparatus to execute the application; and
providing notification that the data recorded in the recording area is to be rewritten to the information for causing the communication apparatus to execute the application in a case where the data recorded in the recording area does not include the information for causing the communication apparatus to execute the application, and not providing the notification in a case where the data includes the information for causing the communication apparatus to execute the application.

13. A method for controlling a communication apparatus configured to connect via second communication different from first communication to an external apparatus configured to record data in a recording area externally readable via the first communication, a communication range of the second communication is longer than a communication range of the first communication, the method comprising:
executing an application;
acquiring data, via the second communication, from the recording area;
determining whether the data recorded in the recording area includes information for causing the communication apparatus to execute the application; and
sending a signal via the second communication instructing the external apparatus to rewrite the data recorded in the recording area to the information for causing the communication apparatus to execute the application in a case where the data recorded in the recording area does not include the information for causing the communication apparatus to execute the application, and not sending the signal in a case where the data includes the information for causing the communication apparatus to execute the application.

14. A non-transitory computer-readable storage medium storing computer executable instructions for causing a computer to execute a method for controlling a communication apparatus configured to connect via a second communication different from a first communication to an external apparatus configured to record data in a recording area externally readable via the first communication, a communication range of the second communication is longer than a communication range of the first communication, the method comprising:
executing an application;
acquiring data, via the second communication, from the recording area;
determining whether the data recorded in the recording area includes information for causing the communication apparatus to execute the application; and
providing notification that the data recorded in the recording area is to be rewritten to the information for causing the communication apparatus to execute the application in a case where the data recorded in the recording area does not include the information for causing the communication apparatus to execute the application, and not providing the notification in a case where the data includes the information for causing the communication apparatus to execute the application.

15. A non-transitory computer-readable storage medium storing computer executable instructions for causing a computer to execute a method for controlling a communication apparatus configured to connect via second communication different from first communication to an external apparatus configured to record data in a recording area externally readable via the first communication, a communication range of the second communication is longer than a communication range of the first communication, the method comprising:

executing an application;

acquiring data, via the second communication, from the recording area;

determining whether the data recorded in the recording area includes information for causing the communication apparatus to execute the application; and sending a signal via the second communication instructing the external apparatus to rewrite the data recorded in the recording area to the information for causing the communication apparatus to execute the application in a case where the data recorded in the recording area does not include the information for causing the communication apparatus to execute the application, and not sending the signal in a case where the data includes the information for causing the communication apparatus to execute the application.

* * * * *